US009084282B2

(12) United States Patent
Rajan et al.

(10) Patent No.: US 9,084,282 B2
(45) Date of Patent: Jul. 14, 2015

(54) APPARATUS AND METHOD FOR PROVIDING A PORTABLE BROADBAND SERVICE USING A WIRELESS CONVERGENCE PLATFORM

(75) Inventors: Rajeev D. Rajan, San Diego, CA (US); Annette J. Beatty, San Diego, CA (US); Rajeev S. Kurundkar, San Diego, CA (US); Kai Tang, San Diego, CA (US)

(73) Assignee: QUALCOMM Incorporated, San Diego, CA (US)

(*) Notice: Subject to any disclaimer, the term of this patent is extended or adjusted under 35 U.S.C. 154(b) by 1256 days.

(21) Appl. No.: 12/576,496

(22) Filed: Oct. 9, 2009

(65) Prior Publication Data

US 2010/0100735 A1    Apr. 22, 2010

Related U.S. Application Data

(60) Provisional application No. 61/106,500, filed on Oct. 17, 2008, provisional application No. 61/149,293, filed on Feb. 2, 2009.

(51) Int. Cl.
| | |
|---|---|
| G06F 7/04 | (2006.01) |
| H04W 88/04 | (2009.01) |
| H04L 29/06 | (2006.01) |
| H04M 1/725 | (2006.01) |
| H04W 4/04 | (2009.01) |
| H04W 12/06 | (2009.01) |

(52) U.S. Cl.
CPC ........... *H04W 88/04* (2013.01); *H04L 63/0823* (2013.01); *H04M 1/7253* (2013.01); *H04M 1/72561* (2013.01); *H04W 4/04* (2013.01); *H04W 12/06* (2013.01)

(58) Field of Classification Search
USPC ........................................................ 713/168
See application file for complete search history.

(56) References Cited

U.S. PATENT DOCUMENTS

| | | | |
|---|---|---|---|
| 6,493,553 B1 | 12/2002 | Rollender | |
| 6,862,444 B2 * | 3/2005 | Karaoguz et al. | ............. 455/408 |
| 6,885,859 B2 * | 4/2005 | Karaoguz et al. | ............. 455/408 |
| 7,434,234 B2 | 10/2008 | Gheorghe et al. | |

(Continued)

FOREIGN PATENT DOCUMENTS

| | | |
|---|---|---|
| JP | 2001036974 A | 2/2001 |
| JP | 2001077878 A | 3/2001 |

(Continued)

OTHER PUBLICATIONS

WindowsME, Understanding UPnP, 2007, Retrieved from the Internet <URL: wayback.archive.org/web/20070901000000*/http://www.upnp.org/download/UPNP_understandi ngUPNP.doc>, pp. 1-45 as printed.*

(Continued)

*Primary Examiner* — Michael Chao
(74) *Attorney, Agent, or Firm* — Kristine U. Ekwueme (57) ABSTRACT

An apparatus and method for providing a portable broadband service, the method comprising enabling a first connectivity between a wireless convergence platform and an Internet gateway; enabling a second connectivity between the wireless convergence platform and at least one device; obtaining an application service through the Internet gateway using the first connectivity; and relaying the application service through the second connectivity to the at least one device.

35 Claims, 9 Drawing Sheets

(56) References Cited

U.S. PATENT DOCUMENTS

| | | | |
|---|---|---|---|
| 7,484,008 B1* | 1/2009 | Gelvin et al. | 709/249 |
| 2005/0233749 A1* | 10/2005 | Karaoguz et al. | 455/442 |
| 2006/0143295 A1* | 6/2006 | Costa-Requena et al. | 709/227 |
| 2008/0075024 A1 | 3/2008 | Chuang et al. | |
| 2008/0184128 A1* | 7/2008 | Swenson et al. | 715/738 |

FOREIGN PATENT DOCUMENTS

| | | |
|---|---|---|
| JP | 2002290509 A | 10/2002 |
| JP | 2006050277 A | 2/2006 |
| KR | 20070037096 A | 4/2007 |
| WO | WO0176154 A2 | 10/2001 |
| WO | WO2007091699 | 8/2007 |
| WO | 2008040120 A1 | 4/2008 |
| WO | 2008117414 A1 | 10/2008 |
| WO | 2008122846 A1 | 10/2008 |

OTHER PUBLICATIONS

Kalofonos, Intuisec: A framework for intuitive user interaction with smart home security using mobile devices, 2007, Retrieved from the Internet <URL: ieeexplore.ieee.org/stamp/stamp.jsp?tp=&arnumber=4394312>, pp. 1-5 as printed.*

Haque, UPnP Networking: Architecture and Security Issues, 2007, Retrieved from the Internet <URL: tml.tkk.fi/Publications/C/25/papers/Haque_final.pdf>, pp. 1-5 as printed.*

Aquino, Grace; Use Your Cell Phone as a Modem for Your PC, PCWorld, 2007, Retrieved from the Internet <URL: pcworld.com/article/140028/article.html?page=0>, pp. 1-12 as printed.*

Caballero et al.; Eperimental Study of a Network Access Server for a public WLAN access network; 2002; Retrieved from the Internet <URL: software.imdea.org/~juanca/papers/Caballero_Malmkvist_MSc_Thesis.pdf>; pp. 1-122 as printed.*

Hwang et al.; Two Layered PKI Model for Device Authentication in Multi-Domain Home Networks; 2006; Retrieved from the Internet <URL: http://ieeexplore.ieee.org/xpls/abs_all.jsp?arnumber=1689451&tag=1>; pp. 1-6 as printed.*

Dong-Oh Kang et al: "UPnP AV Architectural Multimedia System with a Home Gateway Powered by the OSGi Platform" IEEE Transactions on Consumer Electronics, IEEE Service Center, New York, NY, US, Jan. 1, 2005, pp. 87-93, XP003024274 ISSN: 0098-3063 p. 87, right-hand column, paragraph 1—p. 91, left-hand column, paragraph 1 figures 5-9.

Georgios Kambourakis et al: "On Device Authentication in Wireless Networks: Present Issues and Future Challenges" Sep. 3, 2007, Trust, Privacy and Security in Digital Business; [Lecture Notes in Computer Science], Springer Berlin Heidelberg, Berlin, Heidelberg, pp. 135-144, XP019098265.

International Search Report & Written Opinion—PCT/US09/061196—International Search Authority—European Patent Office—May 21, 2010.

Partial International Search Report PCT/US09/061196, International Search Authority—European Patent Office—Feb. 26, 2010.

Yunjung Park et al: "Home multimedia integration system using UPnP and Service Convergence Gateway engine" Research, Innovation and Vision for the Future, 2008. RIVF 2008. IEEE International Conference on, IEEE, Piscataway, NJ, USA, Jul. 13, 2008, pp. 184-190, XP031296000.

Yunjung Park et al: "Home multimedia integration system using UPnP and Service Convergence Gateway engine" Research, Innovation and Vision for the Future, 2008. RIVF 2008. IEEE International Conference on, IEEE, Piscataway, NJ, USA, 13, Jul. 2008, pp. 184-190, XP031296000 ISBN: 978-1-4244-2379-8 p. 184, right-hand column, paragraph 2—right-hand column, paragraph 5 left-hand column, paragraph 4—left-hand column, paragraph 2 right-hand column, paragraph 5—p. 189, left-hand column, paragraph 1 figures 2-4.

Taiwan Search Report—TW098135286—TIPO—Nov. 18, 2012.

* cited by examiner

APPARATUS AND METHOD FOR PROVIDING A PORTABLE BROADBAND SERVICE USING A WIRELESS CONVERGENCE PLATFORM

CLAIM OF PRIORITY UNDER 35 U.S.C. §119

The present Application for Patent claims priority to Provisional Application No. 61/106,500 entitled "Methods and Apparatus for Providing Wireless Convergence Platform" filed Oct. 17, 2008 and assigned to the assignee hereof and hereby expressly incorporated by reference herein. Also, the Application for Patent claims priority to Provisional Application No. 61/149,293 entitled Methods and Apparatus for Remotely Managing Information Provided by a Wireless Device filed Feb. 2, 2009 and assigned to the assignee hereof and hereby expressly incorporated by reference herein.

FIELD

This disclosure relates generally to apparatus and methods for providing wireless connectivity. More particularly, the disclosure relates to providing a portable broadband service using a wireless convergence platform.

BACKGROUND

Communications infrastructure in today's society consists of a wide variety of media, both wired and wireless, to transport information among many spatially distributed users to deliver a variety of services. Each form of communication service may have different service demands in terms of availability, throughput, error quality, timeliness, etc. In some situations wired media are preferred for transport, particularly for bulk data transfer between fixed points. In other scenarios, the desire for mobility and rapid deployment leads to data transport via wireless media. In general, communication among users for voice, video, messaging, etc. may employ both wired and wireless media for data transport.

At the same time, information sharing via packet-switched Internet technology has had unprecedented growth over the past two decades. Internet applications, such as Web browsing, emails, instant messaging, file transfers, etc. have become essential utilities for business, government, and personal transactions. User access to the Internet began primarily using local connections to wired modems or local area networks (LANs) using, for example, Ethernet-based wired networks, but current usage has migrated more and more towards wireless user access using such wireless standards such as the various 802.11 standards (WiFi).

Recently, convergence of traditional wireless and wired communication technologies and the Internet has increased considerably. This convergence has benefitted the user community in several ways. For example, Internet Web browsers are now implemented on mobile devices, information searches may be performed anywhere using wireless access, entertainment content may be easily downloadable onto portable devices, digital voice over Internet protocol (VoIP) telephony may be implemented on personal devices, personal navigation devices (PNDs) may be used while in motion, etc.

However, the downside of this increased diversity of mobile applications has resulted in a multiplicity of dedicated user devices with increased burden of costs, device types, and content management. Today's business challenge is to provide a focused convergence of all of these applications and services into a single platform which provides the access point to the global Internet.

SUMMARY

Disclosed is an apparatus and method for remotely managing information associated with a wireless convergence platform. According to one aspect, a method for providing a portable broadband service, the method comprising: enabling a first connectivity between a wireless convergence platform and an Internet gateway; enabling a second connectivity between the wireless convergence platform and at least one device; using the wireless convergence platform for obtaining an application service through the Internet gateway using the first connectivity; and relaying the application service through the second connectivity to the at least one device.

According to another aspect, a wireless convergence platform for providing a portable broadband service comprising a first interface circuit for enabling a first connectivity between the wireless convergence platform and an Internet gateway; a second interface circuit for enabling a second connectivity between the wireless convergence platform and at least one device; and a processing unit for obtaining an application service through the Internet gateway using the first connectivity, and for relaying the application service through the second connectivity to the at least one device.

According to another aspect, an apparatus for providing a portable broadband service comprising means for enabling a first connectivity between the apparatus and an Internet gateway; means for enabling a second connectivity between the apparatus and at least one device; means for obtaining an application service through the Internet gateway using the first connectivity; and means for relaying the application service through the second connectivity to the at least one device.

According to another aspect, a computer-readable medium storing a computer program, wherein execution of the computer program is for: enabling a first connectivity between a wireless convergence platform and an Internet gateway; enabling a second connectivity between the wireless convergence platform and at least one device; obtaining an application service through the Internet gateway using the first connectivity; and relaying the application service through the second connectivity to the at least one device.

Advantages of the present disclosure include minimizing the quantity of devices necessary for a variety and diversity of mobile applications, and thus, resulting in lower cost and increased convenience to the user. Additional advantage includes transforming a user device into a device with Internet connectivity with minimum or no hardware duplication or service subscriptions. Another advantage is the ability to transform a single service plan to cover multiple devices, thus eliminating duplication of service plans, reducing cost and increasing convenience for the user.

It is understood that other aspects will become readily apparent to those skilled in the art from the following detailed description, wherein it is shown and described various aspects by way of illustration. The drawings and detailed description are to be regarded as illustrative in nature and not as restrictive.

DETAILED DESCRIPTION

The detailed description set forth below in connection with the appended drawings is intended as a description of various aspects of the present disclosure and is not intended to represent the only aspects in which the present disclosure may be practiced. Each aspect described in this disclosure is provided merely as an example or illustration of the present disclosure, and should not necessarily be construed as preferred or advantageous over other aspects. The detailed description includes specific details for the purpose of providing a thorough understanding of the present disclosure. However, it will be apparent to those skilled in the art that the present disclosure may be practiced without these specific details. In some instances, well-known structures and devices are shown in block diagram form in order to avoid obscuring the concepts of the present disclosure. Acronyms and other descriptive terminology may be used merely for convenience and clarity and are not intended to limit the scope of the present disclosure.

While for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

Disclosed herein is an apparatus and method for providing a portable broadband gateway with a wireless convergence platform. Also disclosed herein is the wireless convergence platform which combines the versatility, for example, of the mobile phone with the power of information networks. This wireless convergence platform can leverage highly capable electronic chips to provide capabilities that historically have been provided only by powerful computers (i.e., high CPU cycle rate). The wireless convergence platform performs as a portable broadband information gateway. The solution enables secure Internet-based application connectivity among various digital devices. In one aspect, the wireless convergence platform includes a powerful, Internet-enabled mobile platform for software applications and services combined with spatially separated terminals such as remote displays.

In one example, the wireless convergence platform employs a thin liquid crystal display (LCD) screen (as a display) mounted in a user platform, such as an automobile, which uses a wireless connection to the wireless convergence platform's Web browser or navigation application visually. Additionally, the wireless convergence platform allows the user to enter directives through the LCD touch screen. In one application, the user platform is transformed into a personal navigation device (PND) with the advantages of Internet connectivity with minimum or no hardware duplication or service subscriptions. In another example, for a user platform such as an automobile with an existing navigation system, the user could load a thin client application which allows for the remote display and control of the device through the built-in navigation system.

Figure 1:
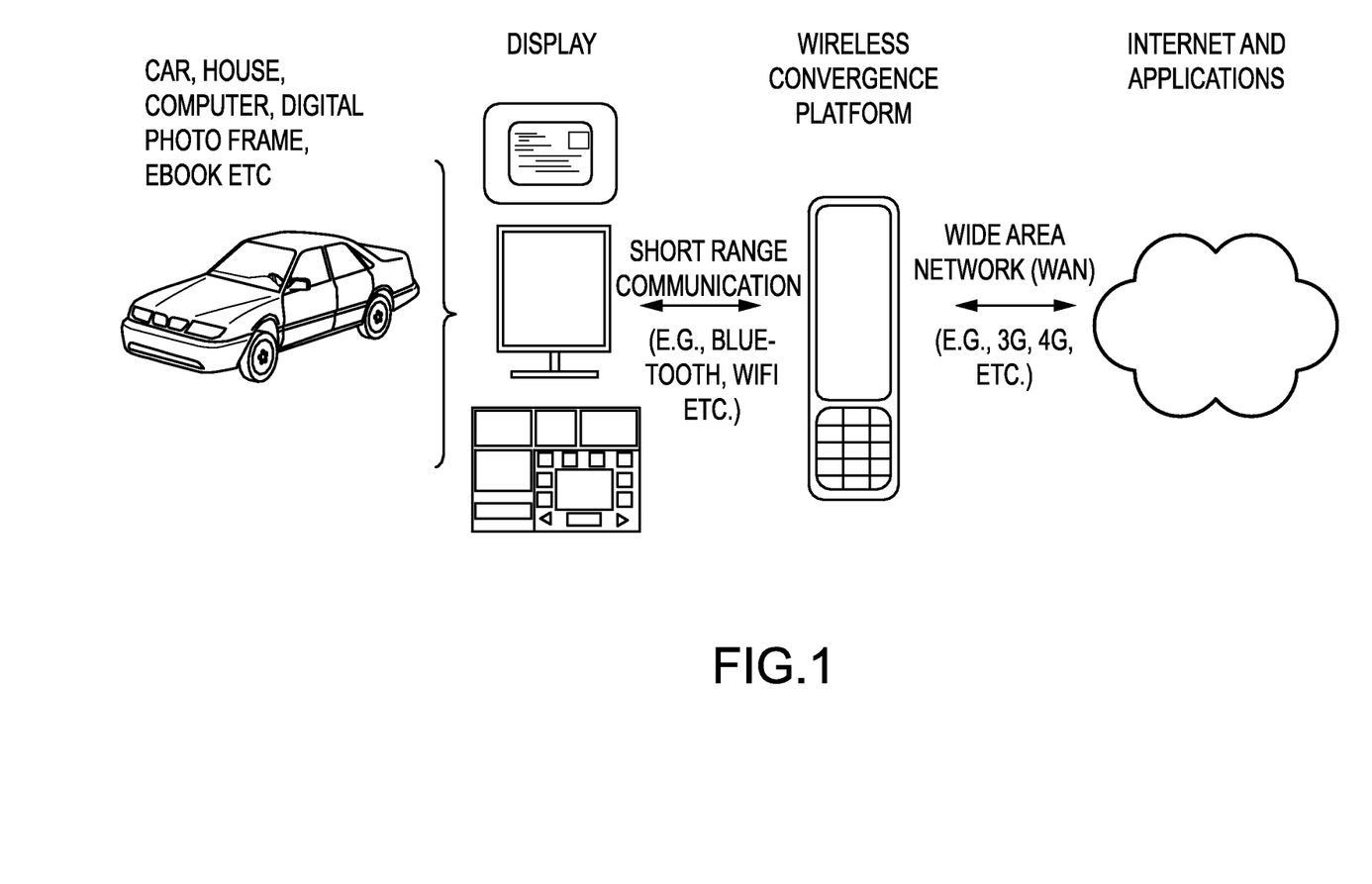
FIG. 1 illustrates an example use case of a wireless convergence platform associated with a user platform, such as an automobile.

FIG. 1 illustrates an example use case of a wireless convergence platform associated with a user platform, such as an automobile. In one example, the interconnection between the display and the wireless convergence platform, which could for example include a cell phone function, could be based on the Bluetooth, WiFi, or wireless LAN, etc. In another example, the wireless access between the wireless convergence platform and various user applications residing on the Internet could be based on third generation (3G) or fourth generation (4G) wireless standards, such as, universal mobile telecommunications system (UMTS), wideband code division multiple access (WCDMA), cdma2000, evolution data-optimized (EV-DO), high speed downlink packet access (HSDPA), long term evolution (LTE), etc. One skilled in the art would understand that the wireless standards stated herein are examples and that other wireless standards, including future generation wireless standards beyond 3G or 4G, may be used without affecting the scope or spirit of the present disclosure.

In other applications, the user platform may not be an automobile, but could be other platforms, such as but not limited to, an aircraft, an ocean craft, a bus, a train, etc. The wireless convergence platform functions as an all-in-one central device with the processing capability, software applications, and extensible user interface to serve as, for example one or more of the following: a personal digital assistant (PDA), a personal navigation device (PND), a digital music player, a digital video player, a podcast, a digital camera, a digital VoIP phone, a Smartphone, a cable set-top box, etc. for the user's needs. Through the wireless convergence platform, the user platform is able to provide one or more of these functionalities. The wireless convergence platform leverages wireless technologies, software applications, wireless local area networks (WLANs), etc. to provide a variety of user services on a variety of user platforms such as on a vehicle, in a building or house, etc.

Figure 2:
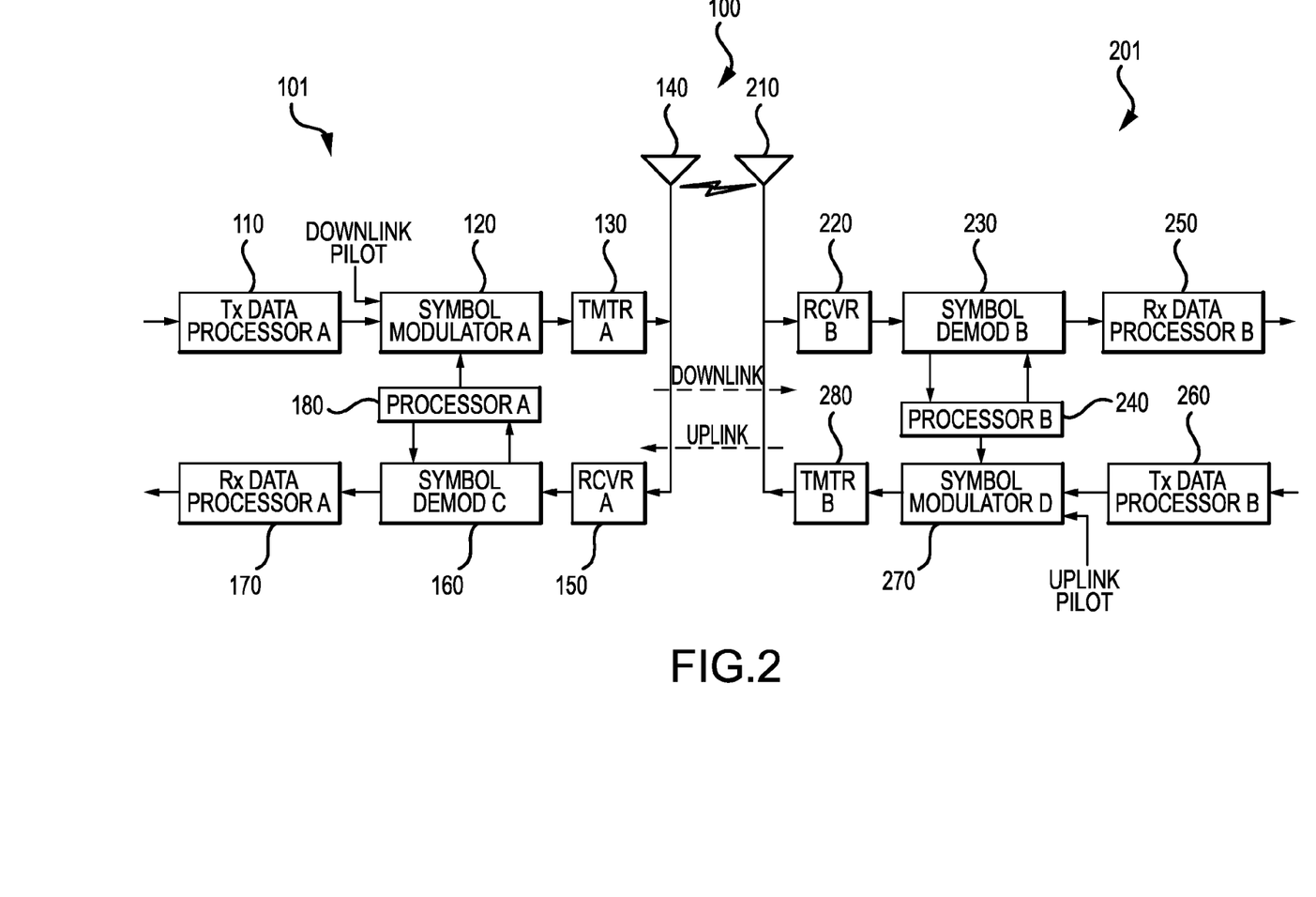
FIG. 2 is a block diagram illustrating an example wireless network environment.

FIG. 2 is a block diagram illustrating an example wireless network environment 100. One skilled in the art would understand that the example wireless network environment 100 illustrated in FIG. 2 may be implemented in a frequency division multiple access (FDMA) environment, an orthogonal frequency division multiple access (OFDMA) environment, a code division multiple access (CDMA) environment, a wideband code division multiple access (WCDMA) environment, a time division multiple access (TDMA) environment, a spatial division multiple access (SDMA) environment, or any other suitable wireless environment.

While, for purposes of simplicity of explanation, the methodologies are shown and described as a series of acts, it is to be understood and appreciated that the methodologies are not limited by the order of acts, as some acts may, in accordance with one or more aspects, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with one or more aspects.

The wireless network environment 100 includes an access node 101 (e.g., access point, base station, etc.) and a user equipment or UE 201 (e.g., wireless communication device, mobile station, wireless convergence platform). In the downlink leg, the access node 101 includes a transmit (TX) data processor A 110 that accepts, formats, codes, interleaves and modulates (or symbol maps) traffic data and provides modulation symbols (e.g., data symbols). The TX data processor A 110 is in communication with a symbol modulator A 120. The symbol modulator A 120 accepts and processes the data symbols and downlink pilot symbols and provides a stream of symbols. In one aspect, symbol modulator A 120 is in communication with processor A 180 which provides configuration information. Symbol modulator A 120 is in communication with a transmitter unit (TMTR) A 130. The symbol modulator A 120 multiplexes the data symbols and downlink pilot symbols and provides them to the transmitter unit A 130.

Each symbol to be transmitted may be a data symbol, a downlink pilot symbol or a signal value of zero. The downlink pilot symbols may be sent continuously in each symbol period. In one aspect, the downlink pilot symbols are frequency division multiplexed (FDM). In another aspect, the downlink pilot symbols are orthogonal frequency division multiplexed (OFDM). In yet another aspect, the downlink pilot symbols are code division multiplexed (CDM). In one aspect, the transmitter unit A 130 receives and converts the stream of symbols into one or more analog signals and further conditions, for example, amplifies, filters and/or frequency upconverts the analog signals, to generate an analog downlink signal suitable for wireless transmission. The analog downlink signal is then transmitted through antenna 140.

In the downlink leg, the UE 201 includes antenna 210 for receiving the analog downlink signal and inputting the analog downlink signal to a receiver unit (RCVR) B 220. In one aspect, the receiver unit B 220 conditions, for example, filters, amplifies, and frequency downconverts the analog downlink signal to a first "conditioned" signal. The first "conditioned" signal is then sampled. The receiver unit B 220 is in communication with a symbol demodulator B 230. The symbol demodulator B 230 demodulates the first "conditioned" and "sampled" signal (e.g., data symbols) outputted from the receiver unit B 220.

One skilled in the art would understand that an alternative is to implement the sampling process in the symbol demodulator B 230. The symbol demodulator B 230 is in communication with a processor B 240. Processor B 240 receives downlink pilot symbols from symbol demodulator B 230 and performs channel estimation on the downlink pilot symbols. In one aspect, the channel estimation is the process of characterizing the current propagation environment. The symbol demodulator B 230 receives a frequency response estimate for the downlink leg from processor B 240. The symbol demodulator B 230 performs data demodulation on the data symbols to obtain data symbol estimates on the downlink path. The data symbol estimates on the downlink path are estimates of the data symbols that were transmitted. The symbol demodulator B 230 is also in communication with a RX data processor B 250.

The RX data processor B 250 receives the data symbol estimates on the downlink path from the symbol demodulator B 230 and, for example, demodulates (i.e., symbol demaps), interleaves and/or decodes the data symbol estimates on the downlink path to recover the traffic data. In one aspect, the processing by the symbol demodulator B 230 and the RX data processor B 250 is complementary to the processing by the symbol modulator A 120 and TX data processor A 110, respectively.

In the uplink leg, the UE 201 includes a TX data processor B 260. The TX data processor B 260 accepts and processes traffic data to output data symbols. The TX data processor B 260 is in communication with a symbol modulator D 270. The symbol modulator D 270 accepts and multiplexes the data symbols with uplink pilot symbols, performs modulation and provides a stream of symbols. In one aspect, symbol modulator D 270 is in communication with processor B 240 which provides configuration information. The symbol modulator D 270 is in communication with a transmitter unit B 280.

Each symbol to be transmitted may be a data symbol, an uplink pilot symbol or a signal value of zero. The uplink pilot symbols may be sent continuously in each symbol period. In one aspect, the uplink pilot symbols are frequency division multiplexed (FDM). In another aspect, the uplink pilot symbols are orthogonal frequency division multiplexed (OFDM). In yet another aspect, the uplink pilot symbols are code division multiplexed (CDM). In one aspect, the transmitter unit B 280 receives and converts the stream of symbols into one or more analog signals and further conditions, for example, amplifies, filters and/or frequency upconverts the analog signals, to generate an analog uplink signal suitable for wireless transmission. The analog uplink signal is then transmitted through antenna 210.

The analog uplink signal from UE 201 is received by antenna 140 and processed by a receiver unit A 150 to obtain samples. In one aspect, the receiver unit A 150 conditions, for example, filters, amplifies and frequency downconverts the analog uplink signal to a second "conditioned" signal. The second "conditioned" signal is then sampled. The receiver unit A 150 is in communication with a symbol demodulator C 160. One skilled in the art would understand that an alternative is to implement the sampling process in the symbol demodulator C 160. The symbol demodulator C 160 performs data demodulation on the data symbols to obtain data symbol estimates on the uplink path and then provides the uplink pilot symbols and the data symbol estimates on the uplink path to the RX data processor A 170. The data symbol estimates on the uplink path are estimates of the data symbols that were transmitted. The RX data processor A 170 processes the data symbol estimates on the uplink path to recover the traffic data transmitted by the wireless communication device 201. The symbol demodulator C 160 is also in communication with processor A 180. Processor A 180 performs channel estimation for each active terminal transmitting on the uplink leg. In one aspect, multiple terminals may transmit pilot symbols concurrently on the uplink leg on their respective assigned sets of pilot subbands where the pilot subband sets may be interlaced.

Processor A 180 and processor B 240 direct (i.e., control, coordinate or manage, etc.) operation at the access node 101 (e.g., base station) and at the UE 201, respectively. In one aspect, either or both processor A 180 and processor B 240 are associated with one or more memory units (not shown) for storing of program codes and/or data. In one aspect, either or both processor A 180 or processor B 240 or both perform computations to derive frequency and impulse response estimates for the uplink leg and downlink leg, respectively.

In one aspect, the wireless network environment 100 is a multiple-access system. For a multiple-access system (e.g., frequency division multiple access (FDMA), orthogonal frequency division multiple access (OFDMA), code division multiple access (CDMA), time division multiple access (TDMA), space division multiple access (SDMA), etc.), multiple terminals transmit concurrently on the uplink leg, allowing access to a plurality of UEs. In one aspect, for the multiple-access system, the pilot subbands may be shared among different terminals. Channel estimation techniques are used in cases where the pilot subbands for each terminal span the entire operating band (possibly except for the band edges). Such a pilot subband structure is desirable to obtain frequency diversity for each terminal.

In one example, the wireless convergence platform comprises a software applications/services platform, multipoint connectivity, and an Internet browser-based engine. In one aspect, multipoint connectivity includes Internet connectivity, via, for example, always-on broadband access or lower rate access such as 3G or 4G wireless technologies such as cdma 2000, evolution data optimized (EV-DO), high speed downlink packet access (HSDPA), etc. In another aspect, multipoint connectivity includes intelligent connectivity between the wireless convergence platform and separate terminals such as remote displays or dumb terminals using, for example, Bluetooth, serial line Internet protocol (SLIP), wireless USB (universal serial bus), WiFi, radio frequency identification (RFID), etc.

Although the automobile example has been discussed as a suitable host (i.e., the user platform) for the wireless convergence platform, it is but one example. One skilled in the art would understand that the wireless convergence platform is suitable for many other hosts with the need for a variety of application and services. For example, one market segment for the wireless convergence platform are any moving vehicles, such as automobiles, aircrafts, boats, trains, trucks, subways, etc. Other example market segments include, but are not limited to, homes, digital photo frames, electronic books (ebooks), portable televisions, etc. One skilled in the art would understand that many other user platforms can be used as a host for the wireless convergence platform without affecting the scope or spirit of the present disclosure. In one aspect, the wireless convergence platform serves as an all-in-one central device with the processing power, software applications and services and extensible user interface to provide navigation, music, video, Smartphone services, data download, etc.

In one aspect, the wireless convergence platform may comprise a software applications and services platform based on, for example, BREW Mobile Platform (BMP), binary runtime environment for wireless (BREW), Java 2 micro edition (J2ME), etc., an Internet browser (either standard or customized), and platform interfaces to extend its capabilities for multipoint connectivity.

In one aspect, the console/display terminal may comprise a simple terminal with a connectivity chip (compatible with, for example, 3G, WiFi, Bluetooth, etc.) and a small application layer, one or multi-way communication with the wireless convergence platform, and an intelligent or sophisticated voice-activated terminal with a touch-screen.

In one aspect, a prototype application/service comprises a navigator application (e.g. Verizon (VZW) navigator) on the wireless convergence platform. The prototype application/service may be connected to the Internet to obtain updates, traffic alerts, etc. The display information may be sent from the wireless convergence platform to a small console device such as Chumby (either external or part of the wireless convergence platform) or to the user platform's built-in display unit via Bluetooth, WiFi or another suitable wireless link.

Figure 3:
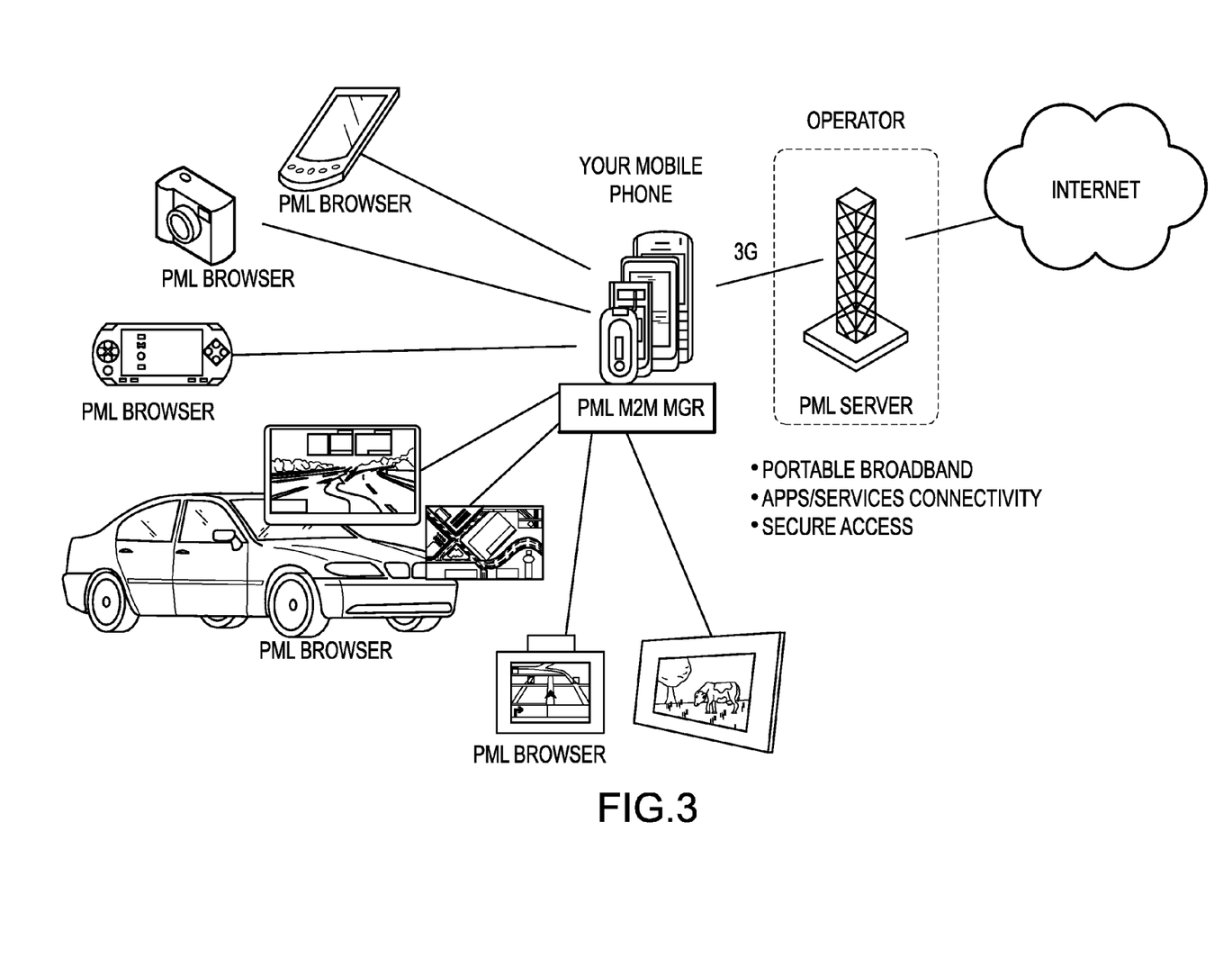
FIG. 3 illustrates an example deployment of the wireless convergence platform.

FIG. 3 illustrates an example deployment of the wireless convergence platform. On the left hand side of FIG. 3 are various devices (e.g., consumer electronic devices, consumer devices, etc.) such as palm computers, digital cameras, personal digital assistants (PDAs), personal navigation devices, etc. One skilled in the art would understand that the example devices shown are not exclusive and that the scope and spirit of the present disclosure encompass other devices, such as but not limited to, portable music devices, diagnostic devices such as medical diagnostic devices, printers, gaming devices, etc.

Each of the devices includes a thin software layer which is a protocol and markup language (PML) component which sits above the Transport Control Protocol/Internet Protocol (TCP/IP) layer in the interconnection protocol stack. PML manages the end-to-end connectivity and secures user access. The various devices connect to the wireless convergence platform through a wireless connection, such as, Bluetooth, WiFi, or wireless LAN, etc. In addition, the wireless convergence platform uses an additional wireless interface, for example based on 3G standards, to connect to an PML server and on to the Internet. In one example, the wireless convergence platform connects to the Internet using various wireless standards, including but not limited to cdma, UMTS, wireless microwave access (WiMax), high speed downlink packet access (HSDPA), long term evolution (LTE), etc. As illustrated in FIG. 3, the wireless convergence platform is the PML machine-to-machine (M2M) Manager, and in the example, is depicted as a mobile phone. The example deployment of the wireless convergence platform includes portable broadband connectivity, allows application & service connectivity and secure access for a user platform.

In one example, a digital camera is the device and the user uploads videos or pictures to Web sharing sites in real-time with much greater coverage than WiFi. In one aspect, the digital camera or its digital storage card is enabled to communicate with the wireless convergence platform using PML. In one example, location based services or photo tags are embedded into PML. Contents of the digital camera may be communicated to another user via the wireless convergence platform.

In one example, a portable game console is the device and the user interacts with the latest game consoles with advanced graphics and processors. In one example, PML is used for low-latency point-to-point games or location based services to find other players in the vicinity of the user. And, interaction between the user and other players on a game application is enabled via the wireless convergence platform.

In one example, an e-book is the device and the user is able to download books and information sources, such as newspapers, magazines, latest best seller novel etc., to allow more functionality with the removal of wireless components in the device.

In one example, an automobile computer is the device where the user uses the wireless convergence platform for car and navigation communication. Additionally, communications to other users or for data downloading may be added.

In one example, secure access is obtained from the device. In this case, users may obtain strong, multi-factor authentication to connect to private services on the Internet.

Figure 4:
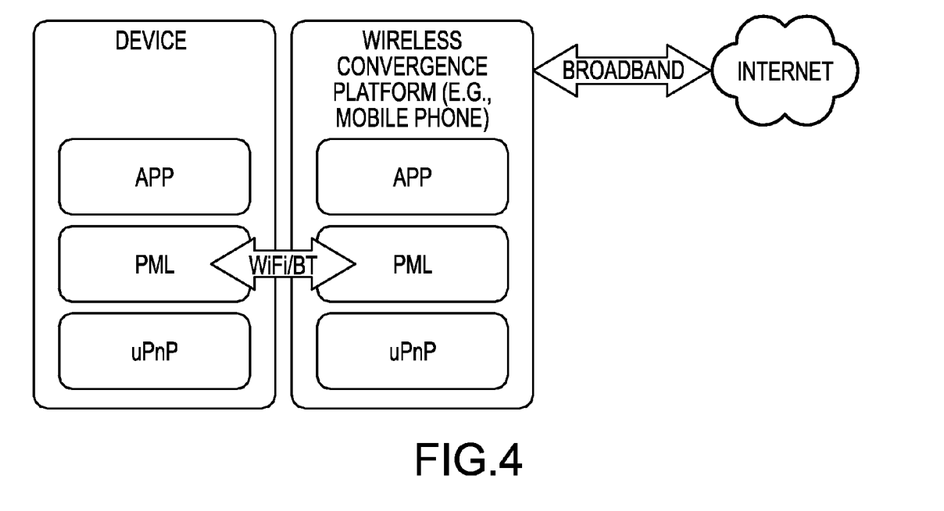
FIG. 4 illustrates an example of network connectivity in the wireless convergence platform.

FIG. 4 illustrates an example of network connectivity in the wireless convergence platform. A wireless LAN or Bluetooth connection is used as a local area access path between the device and the wireless convergence platform, for example, a mobile phone. The wireless convergence platform is configured as an access point or router and transports data between the device and the Internet via a wireless broadband connection. In addition, the protocol stack uses Universal Plug and Play (uPnP) connectivity protocols to allow seamless connectivity of the digital devices with the wireless convergence platform. The PML layer resides on top of the Universal Plug and Play (uPnP) layer, and the application layer resides on top of the PML layer.

Figure 5:
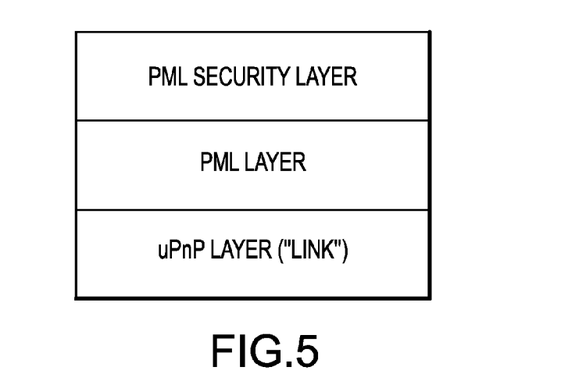
FIG. 5 illustrates an example protocol and markup language (PML) protocol stack.

FIG. 5 illustrates an example protocol and markup language (PML) protocol stack. At the lowest network protocol layer, the uPnP layer, TCP/IP is implemented as the transport/network layer protocol with device discovery implemented through the Extensible Markup Language (XML). In addition, other protocols such as simple object access protocol (SOAP) and simple service discovery protocol (SSDP) may be used. The next protocol layer, PML layer, is used for extending the uPnP layer for each device, for example, camera, camcorder, PND, eBook reader, etc. In addition, billing support may be included. Finally, at the topmost layer, the PML security layer, scenario level authentication may be provided. In one example, before a secure transaction is executed, the device seeks a code/key/certificate from the wireless convergence platform that is controlling the wireless connection. In one example, this key is a Rivest Shamir Adleman (RSA) secure key or a similar secure key. In another example, the key is a secured identification code to create a secure virtual private network (VPN).

In one aspect, the authentication procedures include the concept of a user account. For example, a user account can be as simple as a login-password as a primary key or a more complex key, for example, <User Name or login><Password> followed by n (0, 1 . . . n) secondary keys. The user account is associated with the identification (id) of each device (e.g. media access control (MAC) address, Internet Protocol (IP) address, electronic serial number (ESN), etc.). In one aspect, a credential is defined as: User Account+Device Id+Secondary Keys. A credential is created and managed by the protocol and markup language (PML) component in association with the Internet gateway and is the primary key to manage PML device credentials. Examples include: a) a simple user account with the following format of <username or login><Password> (e.g., "JaneDoe""abc123"); b) a simple device credential with the following format of <username or login><Password><ESN> (e.g., "JaneDoe""abc123""0x12345678"); c) a complex device credential with the following format of <username or login><Password><ESN><MAC><User string> (e.g., "JaneDoe""abc123""0x12345678""0xffffffff" <"Mother's maiden name">.

In one aspect, the authentication procedures include tight credential management of all devices (slaves) paired with the main device (master). In one example, the user's primary mobile device (e.g. wireless convergence platform, phone) is the "master". All other devices such as digital camera, photoframe etc. are "slaves". In one example, a trusted list of all slave devices is maintained by the master device, a network to which the master device belongs or the Internet. In another example the trusted list is maintained by any combination of the master device, the network or the Internet.

When a slave device is acquired or bought, etc. by the user, it is "paired" with the master device through the short-range communication (e.g., Bluetooth, WiFi, etc.) and stored on the device and on the internet. In one example, the list of credentials is the Trusted List.

For each mobile transaction between each digital device on the long-range communication (e.g., wide area network (WAN) such as 3G, 4G, etc.), the credential is authenticated before the transaction can proceed. If a device not in the trusted list tries to make a transaction, authentication will fail, and the transaction will not be allowed to proceed. In one example, the credential management is done on the master device and can be integrated with the carrier's billing system or data plan. For example, the first time a master device connects to a PML credential management server (carrier managed or independent), the credentials for the transaction are authenticated. In one aspect, if authentication is successful, all credentials are downloaded to the master device so that future slave device authentication is managed by the master device without network access to the server. Another approach is that in every transaction between the master device and the slave device, the credential management requires network access to the server. Alternatively, there could be other ways, such as, the credential management can be limited to a fixed number of slave devices per data plan. For example, the limit could be two cameras and one digital photo frame, etc. In one aspect, the credential management is performed by one of the following: the master device, a network to which the master device belongs or the Internet. One skilled in the art would understand that the various examples given herein are not limiting or exclusive, and that other examples and variations may be used without affecting the spirit or scope of the present disclosure.

The wireless convergence platform expands on the in-built capabilities of uPnP layer. Current uPnP implementations provide some but not all of the necessary functionality to perform use cases. In one example, the following functionality can be provided in the PML layer:

Addressing—the wireless convergence platform acts as a wireless access point and provides a local IP address to all devices requesting for service.

Service Discovery—once a device obtains an IP address, it advertises its services through uPnP discovery protocol to the wireless convergence platform which acts as a uPnP control point.

Description—the wireless convergence platform receives detailed description of the capabilities and additional information of each device through PML extensions to the Extensible Markup Language (XML) framework provided by the uPnP layer. In one aspect, the wireless convergence platform makes the request for the detailed description from the devices.

Event Notification—the wireless convergence platform subscribes to specific events from each device and takes action based on these events. For example, when photos are taken in a camera, the wireless convergence platform is notified of the new photos and will take appropriate action such as pulling the photos from the camera and uploading them to an Internet site with geotagging and voice tagging.

In another aspect, a tiered pricing structure is implemented for the services of the wireless convergence platform. In one example, the tiered pricing structure is based on PML added service usage statistics for each device. This usage is conveyed by the wireless convergence platform to the billing servers to facilitate the tiered pricing for these services. In another aspect, a variable pricing is implemented wherein the variable pricing is based on one or more of the following factors, for example, geographical area, user demographics, application type and popularity, time zone, etc.

Figure 6:
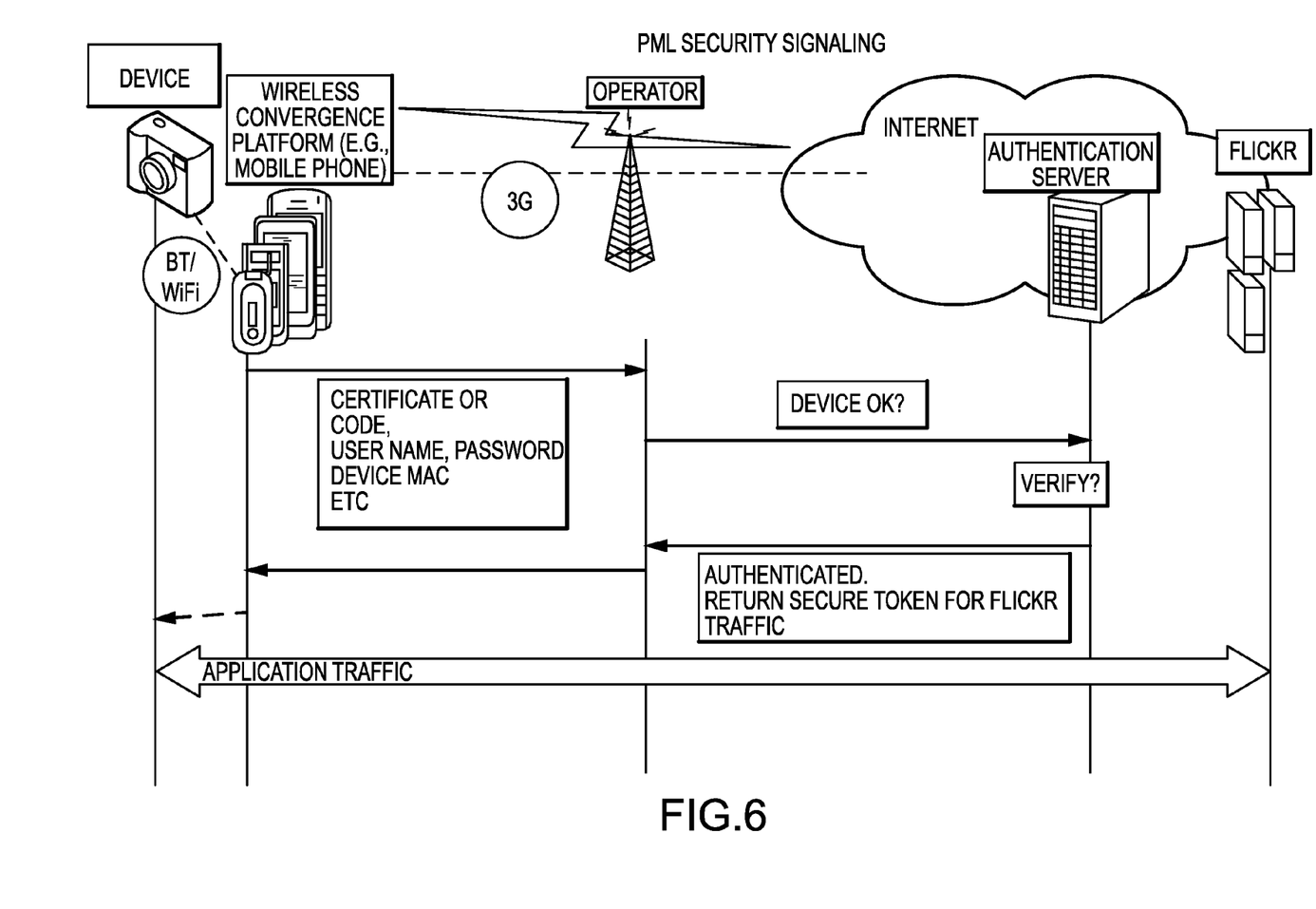
FIG. 6 illustrates an example of protocol and markup language (PML) security signaling.

FIG. 6 illustrates an example of protocol and markup language (PML) security signaling. FIG. 6 shows the interactions among devices in the first column, wireless convergence platform (e.g. mobile phone) in the second column, the operator in the third column, authentication server in the fourth column, and application service in the fifth column. The wireless convergence platform relays authentication and a secure channel for each device. The conceptual diagram in FIG. 6 shows an authentication server, which provides authentication and billing support for service. In order to prevent any unauthorized use of devices, a subscriber registers the devices it wants to use with the server. A unique identification such as electronic serial number (ESN) or media access control (MAC) identification will be provisioned in the server. Once the device is authenticated, the server returns a secure token to the device, which is used to create a secure channel from the device to the Internet application server. In one aspect, the server is used as a billing server for each device. In one aspect, tiered pricing is facilitated based on how many devices are used and how much each device is used per mobile subscription.

Figure 7:
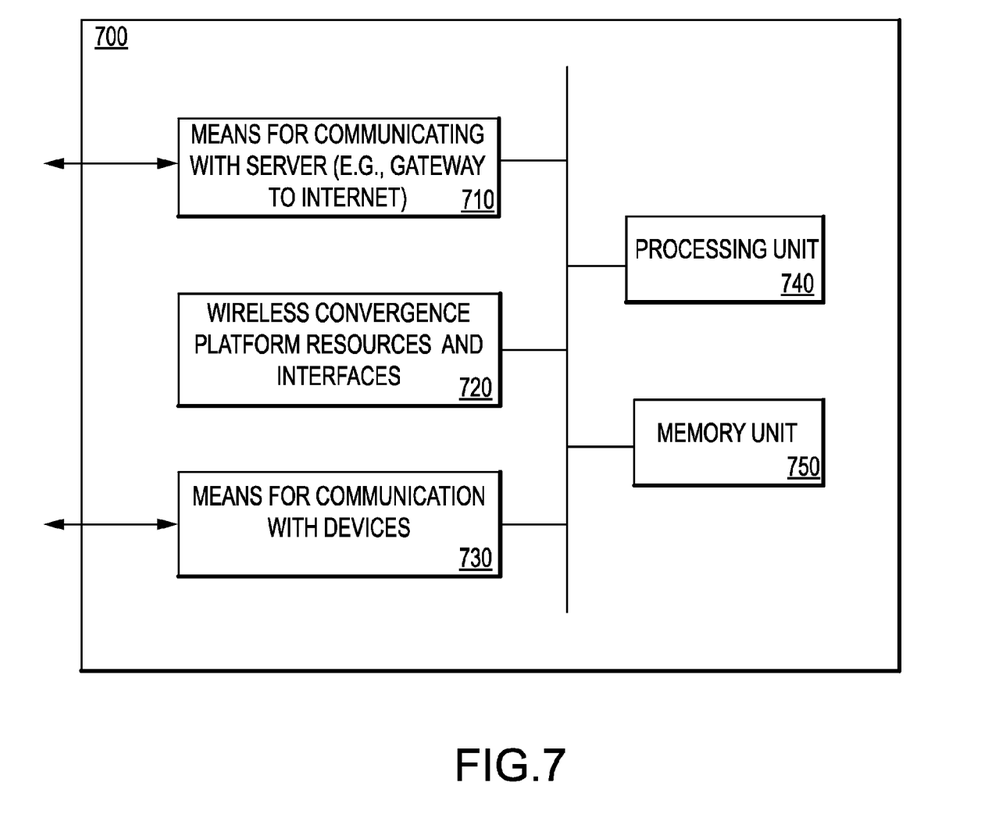
FIG. 7 is a block diagram illustrating an example wireless convergence platform.

FIG. 7 is a block diagram illustrating an example wireless convergence platform 700. In one aspect, the wireless convergence platform comprises a means 710 for communicating with a server, for example, a gateway to the Internet. In one example, the means 710 for communicating with the server includes an antenna and a transceiver which is part of an interface circuit (a.k.a. a first interface circuit). The wireless convergence platform also comprises means 730 for communicating with the devices, wherein the means may include an interface circuit (a.k.a. a second interface circuit) for wireless communication or possibly some wired communication ports such as a Universal Serial Bus (USB) port. In one aspect, the means 730 also comprises an antenna and a transceiver for receiving communication from devices. In one example, the means 730 shares the same antenna and the same transceiver with the means 710.

The wireless convergence platform also comprises resources and interface 720. In one example, a console/display terminal is one of the interfaces of the wireless convergence. In another example, the platform resources include software applications stored in a memory unit 750 and services such as BREW Mobile Platform (BMP), binary runtime environment for wireless (BREW), Java 2 micro edition (J2ME), Internet browser, etc. Additionally, the wireless convergence platform also comprises a processing unit 740 for executing its functionalities and the memory unit 750 for storage of information. As illustrated in FIG. 7, the various components of the wireless convergence are coupled to each other.

Figure 8:
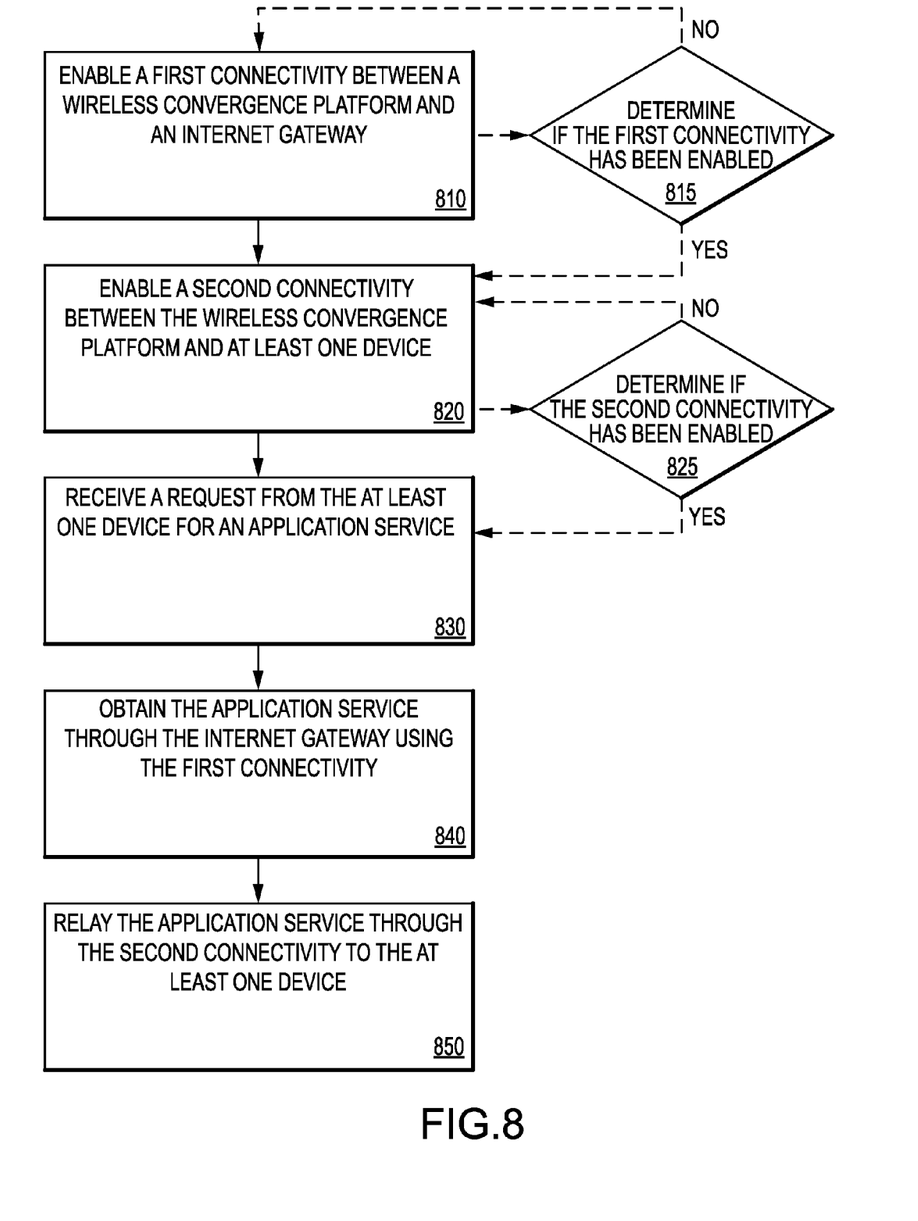
FIG. 8 is an example flow diagram for providing a portable broadband service using a wireless convergence platform.

FIG. 8 is an example flow diagram for providing a portable broadband service using a wireless convergence platform. In block 810, enable a first connectivity between the wireless convergence platform and an Internet gateway. In one example, the interface circuit in item 710 is used for enabling the first connectivity. In block 815, determine if the first connectivity has been enabled. If yes, proceed to block 820. If no, proceed back to block 810 to again enable the first connectivity. The step in block 815 is an optional step and can precede the step in block 820.

In block 820, enable a second connectivity between the wireless convergence platform and at least one device. In one example, item 730 is used for enabling the second connectivity. In block 825, determine if the second connectivity has been enabled. If yes, proceed to block 830. If no, proceed back to block 820 to again enable the second connectivity. The step in block 825 is an optional step and can precede the step in block 830. One skilled in the art would understand that although block 810 is illustrated here to precede block 820, that an interchange in order (whereby block 820 precedes block 810) is acceptable and will not affect the scope or spirit of the present disclosure.

In block 830, receive a request from the at least one device for an application service, wherein the application service is to be obtained through the Internet gateway. In one example, the application service is associated with the functionality in the at least one device. In one example, the request is received by the wireless convergence platform. And, the request is communicated to the wireless convergence platform through the second connectivity.

Following block 830, in block 840, obtain the application service through the Internet gateway using the first connectivity. In one example, the step in block 840 is performed by the processing unit 740 as shown in FIG. 7. In one aspect, the wireless convergence platform obtains the application service. Following block 840, in block 850, relay the application service through the second connectivity to the at least one device. In one aspect, the steps of blocks 830 through 850 are repeated one or more times to accommodate one or more request for application services from different devices. In one aspect, the different devices are associated with the same user platform, for example, a vehicle, a building or house, etc.

One skilled in the art would understand that the steps disclosed in the example flow diagram in FIG. 8 can be interchanged in their order without departing from the scope and spirit of the present disclosure. Also, one skilled in the art would understand that the steps illustrated in the flow diagram are not exclusive and other steps may be included or one or more of the steps in the example flow diagram may be deleted without affecting the scope and spirit of the present disclosure.

Those of skill would further appreciate that the various illustrative components, logical blocks, modules, and/or algorithm steps described in connection with the examples disclosed herein may be implemented as electronic hardware, firmware, computer software, or combinations thereof. To clearly illustrate this interchangeability of hardware, firmware and software, various illustrative components, blocks, modules, and/or algorithm steps have been described above generally in terms of their functionality. Whether such functionality is implemented as hardware, firmware or software depends upon the particular application and design constraints imposed on the overall system. Skilled artisans may implement the described functionality in varying ways for each particular application, but such implementation decisions should not be interpreted as causing a departure from the scope or spirit of the present disclosure.

For example, for a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described therein, or a combination thereof. With software, the implementation may be through modules (e.g., procedures, functions, etc.) that perform the functions described therein. The software codes may be stored in memory units and executed by a processor unit. Additionally, the various illustrative flow diagrams, logical blocks, modules and/or algorithm steps described herein may also be coded as computer-readable instructions carried on any computer-readable medium known in the art or implemented in any computer program product known in the art.

In one or more examples, the steps or functions described herein may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

Figure 9:
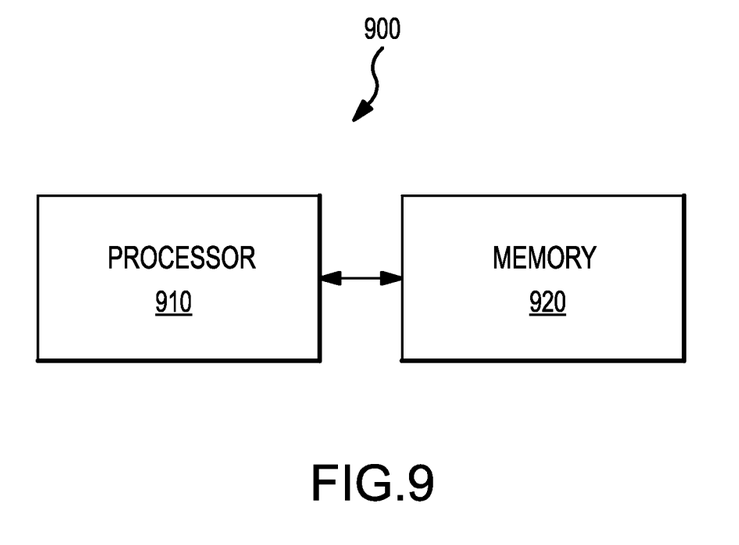
FIG. 9 illustrates an example of a device comprising a processor in communication with a memory for executing the processes for providing a portable broadband service using a wireless convergence platform.

In one example, the illustrative components, flow diagrams, logical blocks, modules and/or algorithm steps described herein are implemented or performed with one or more processors. In one aspect, a processor is coupled with a memory which stores data, metadata, program instructions, etc. to be executed by the processor for implementing or performing the various flow diagrams, logical blocks and/or modules described herein. FIG. 9 illustrates an example of a device 900 comprising a processor 910 in communication with a memory 920 for executing the processes for providing a portable broadband service using a wireless convergence platform. In one example, the device 900 is used to implement the algorithm illustrated in FIG. 8. In one aspect, the memory 920 is located within the processor 910. In another aspect, the memory 920 is external to the processor 910. In one aspect, the processor includes circuitry for implementing or performing the various flow diagrams, logical blocks and/or modules described herein.

Figure 10:
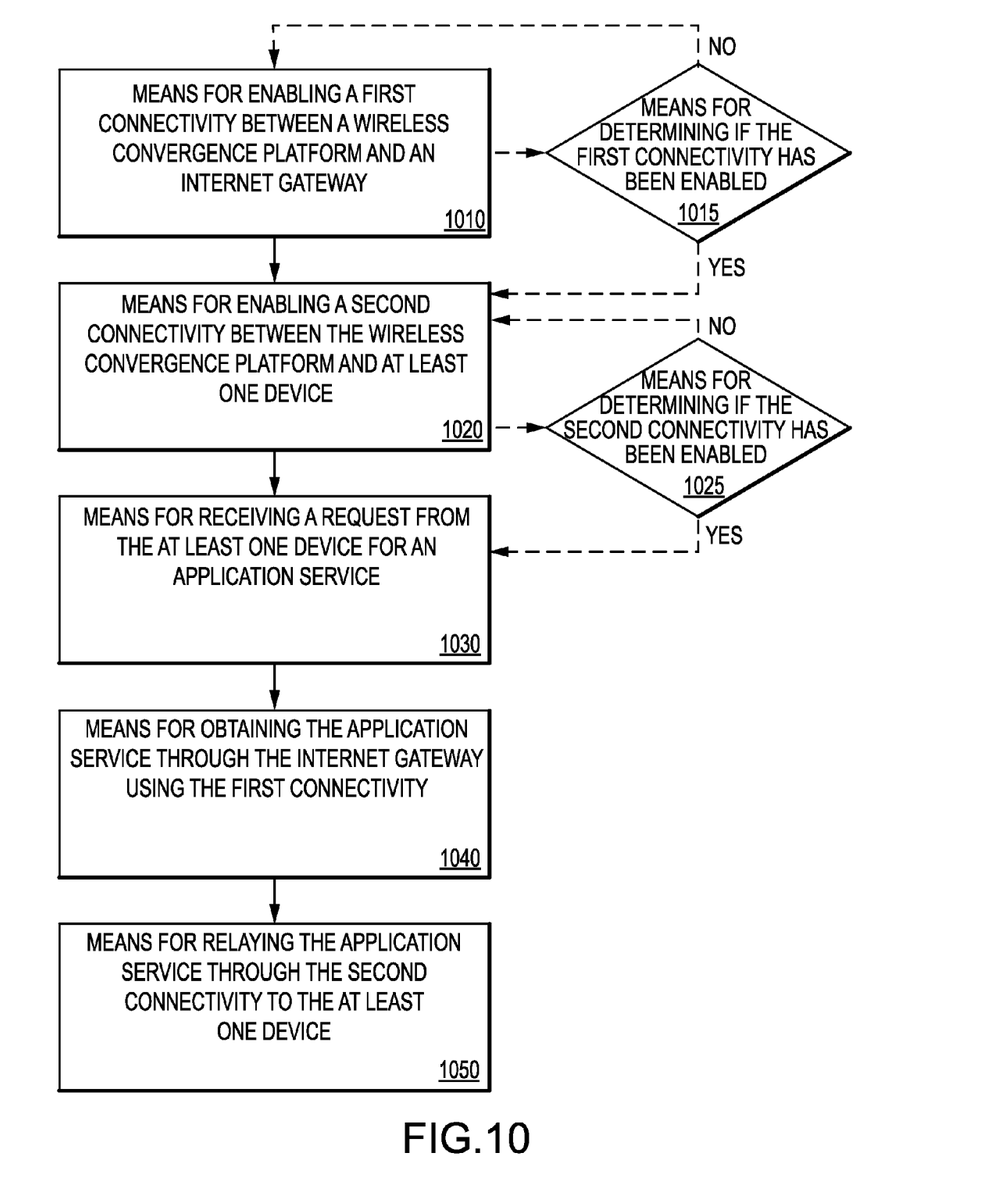
FIG. 10 illustrates an example of a device 1000 suitable for providing a portable broadband service using a wireless convergence platform.

FIG. 10 illustrates an example of a device 1000 suitable for providing a portable broadband service using a wireless convergence platform. In one aspect, the device 1000 is implemented by at least one processor comprising one or more modules configured to provide different aspects of providing a portable broadband service using a wireless convergence platform as described herein in blocks 1010, 1015, 1020, 1025, 1030, 1040 and 1050. For example, each module comprises hardware, firmware, software, or any combination thereof. In one aspect, the device 1000 is also implemented by at least one memory in communication with the at least one processor.

The previous description of the disclosed aspects is provided to enable any person skilled in the art to make or use the present disclosure. Various modifications to these aspects will be readily apparent to those skilled in the art, and the generic principles defined herein may be applied to other aspects without departing from the spirit or scope of the disclosure.

The invention claimed is:

1. A method for providing a portable broadband service by a wireless communication device, the method comprising:
    enabling a first connectivity between a wireless convergence platform of the wireless communication device and an Internet gateway;
    enabling a second connectivity between the wireless convergence platform and at least one device;
    relaying authentication information from an authentication and billing support server, and providing a secure channel for the at least one device based on the authentication information to obtain a requested application service;
    obtaining, by the wireless convergence platform of the wireless communication device, the requested application service through the Internet gateway using the first connectivity; and
    relaying the application service through the second connectivity via the secure channel to the at least one device upon detecting the authentication and billing support server authenticating the at least one device.

2. The method of claim 1, further comprising obtaining a different application service and relaying the different application service to a different device, wherein the at least one device and the different device are both associated with a user platform.

3. The method of claim 1, further comprising receiving a request from the at least one device for the requested application service.

4. The method of claim 1, wherein the first connectivity uses either a third generation (3G) wireless standard or a fourth generation (4G) wireless standard.

5. The method of claim 1, wherein each respective software layer of the wireless convergence platform and the at least one device is higher than an Universal Play and Play (uPnP) layer in each respective interconnection protocol stack.

6. The method of claim 1, wherein each respective software layer of the wireless convergence platform and the at least one device resides in a PML layer in each respective interconnection protocol stack.

7. The method of claim 1, wherein the authentication information comprises an electronic serial number (ESN) or a media access control (MAC) identification.

8. The method of claim 1, wherein the secure channel is established based on a Rivest Shamir Adleman (RSA) secure key.

9. The method of claim 1, wherein the authentication information is obtained from a credential management of a master device paired with at least one slave device.

10. The method of claim 1, wherein the first connectivity employs a wireless communication technology different than that of the second connectivity.

11. The method of claim 1, further comprising providing a tiered pricing structure for one or more application services obtained via the wireless convergence platform for each associated device at least based on PML service usage statistics for each associated device.

12. The method claim 1, wherein the wireless convergence platform of the wireless communication device employs Universal Play and Play (uPnP) technology.

13. A wireless convergence platform of a wireless communication device for providing a portable broadband service, comprising:
    a first interface circuit for enabling a first connectivity between the wireless convergence platform of the wireless communication device and an Internet gateway;
    a second interface circuit for: enabling a second connectivity between the wireless convergence platform and at least one device, relaying authentication information from an authentication and billing support server, and providing a secure channel for the at least one device based on the authentication information to obtain a requested application service; and
    a processing unit for obtaining the requested application service through the Internet gateway using the first connectivity, and for relaying the application service through the second connectivity via the secure channel to the at least one device upon detecting the authentication and billing support server authenticating the at least one device.

14. The wireless convergence platform of claim 13, wherein the processing unit obtains a different application service and relays the different application service to a different device, wherein the at least one device and the different device are both associated with a user platform.

15. The wireless convergence platform of claim 13, wherein each respective software layer of the wireless convergence platform and the at least one device is higher than an Universal Play and Play (uPnP) layer in each respective interconnection protocol stack.

16. The wireless convergence platform of claim 13, wherein the authentication information is obtained from a credential management of a master device paired with at least one slave device.

17. An apparatus of a wireless communication device for providing a portable broadband service, comprising:
means for enabling a first connectivity between the apparatus and an Internet gateway;
means for enabling a second connectivity between the apparatus and at least one device;
means for relaying authentication information from an authentication and billing support server, and for providing a secure channel for the at least one device based on the authentication information to obtain a requested application service;
means for obtaining the requested application service through the Internet gateway using the first connectivity; and
means for relaying the application service through the second connectivity via the secure channel to the at least one device upon detecting the authentication and billing support server authenticating the at least one device.

18. The apparatus of claim 17, further comprising means for obtaining a different application service and relaying the different application service to a different device, wherein the at least one device and the different device are both associated with a user platform.

19. The apparatus of claim 17, wherein each respective software layer of the apparatus and the at least one device is higher than an Universal Play and Play (uPnP) layer in each respective interconnection protocol stack.

20. The apparatus of claim 17, wherein each respective software layer of the apparatus and the at least one device resides in a PML layer in each respective interconnection protocol stack.

21. The apparatus of claim 17, wherein the authentication information comprises an electronic serial number (ESN) or a media access control (MAC) identification.

22. The apparatus of claim 17, wherein the secure channel is established based on a Rivest Shamir Adleman (RSA) secure key.

23. The apparatus of claim 17, wherein the authentication information is obtained from a credential management of a master device paired with at least one slave device.

24. The apparatus of claim 23, wherein the master device obtains a different application service and relays the different application service to a different slave device, wherein the at least one slave device and the different slave device are both associated with a user platform.

25. The apparatus of claim 23, wherein the at least one slave device includes a software layer comprising a protocol and markup language (PML) component for managing the second connectivity with the apparatus with minimum or no hardware duplication or service subscriptions.

26. The apparatus of claim 25, wherein the software layer is higher than an Universal Play and Play (uPnP) layer in an interconnection protocol stack of the at least one slave device.

27. An apparatus of a wireless communication device for providing a portable broadband service, comprising:
at least one processor, comprising hardware, configured for:
enabling a first connectivity between the apparatus and an Internet gateway;
enabling a second connectivity between the apparatus and at least one device;
relaying authentication information from an authentication and billing support server, and providing a secure channel for the at least one device based on the authentication information to obtain a requested application service;
obtaining the requested application service through the Internet gateway using the first connectivity; and
relaying the application service through the second connectivity via the secure channel to the at least one device upon detecting the authentication and billing support server authenticating the at least one device.

28. The apparatus of claim 27, wherein the at least one processor is further configured for obtaining a different application service and relaying the different application service to a different device, wherein the at least one device and the different device are both associated with a user platform.

29. The apparatus of claim 27, wherein each respective software layer of the wireless convergence platform and the at least one device is higher than an Universal Play and Play (uPnP) layer in each respective interconnection protocol stack.

30. The apparatus of claim 27, wherein each respective software layer of the wireless convergence platform and the at least one device resides in a PML layer in each respective interconnection protocol stack.

31. The apparatus of claim 27, wherein the authentication information comprises an electronic serial number (ESN) or a media access control (MAC) identification.

32. The apparatus of claim 27, wherein the secure channel is established based on a Rivest Shamir Adleman (RSA) secure key.

33. The apparatus of claim 27, wherein the authentication information is obtained from a credential management of a master device paired with at least one slave device.

34. A non-transitory computer-readable medium storing a computer program executable by a wireless communication device, wherein execution of the computer program is for:
enabling a first connectivity between a wireless convergence platform of the wireless communication device and an Internet gateway;
enabling a second connectivity between the wireless convergence platform and at least one device;
relaying authentication information from an authentication and billing support server, and providing a secure channel for the at least one device based on the authentication information to obtain a requested application service;
obtaining the requested application service through the Internet gateway using the first connectivity; and
relaying the application service through the second connectivity via the secure channel to the at least one device upon detecting the authentication and billing support server authenticating the at least one device.

35. The non-transitory computer-readable medium of claim 34, wherein execution of the computer program is further for obtaining a different application service and relaying the different application service to a different device, wherein the at least one device and the different device are both associated with a user platform.

* * * * *